United States Patent
White et al.

(10) Patent No.: US 12,517,193 B1
(45) Date of Patent: Jan. 6, 2026

(54) SCHOTTKY-HALL EFFECT AND SENSOR

(71) Applicants: Thomas Paul White, Lubbock, TX (US); Gregory Salamo, Fayetteville, AR (US); Homer Alan Mantooth, Fayetteville, AR (US); Morgan E. Ware, Fayetteville, AR (US); Satish Shetty, Fayetteville, AR (US)

(72) Inventors: Thomas Paul White, Lubbock, TX (US); Gregory Salamo, Fayetteville, AR (US); Homer Alan Mantooth, Fayetteville, AR (US); Morgan E. Ware, Fayetteville, AR (US); Satish Shetty, Fayetteville, AR (US)

( * ) Notice: Subject to any disclaimer, the term of this patent is extended or adjusted under 35 U.S.C. 154(b) by 715 days.

(21) Appl. No.: 17/677,127

(22) Filed: Feb. 22, 2022

Related U.S. Application Data

(63) Continuation-in-part of application No. 16/415,049, filed on May 17, 2019, now abandoned.

(51) Int. Cl.
*G01R 33/07* (2006.01)
*H10N 52/00* (2023.01)
*H10N 52/85* (2023.01)

(52) U.S. Cl.
CPC ......... *G01R 33/072* (2013.01); *H10N 52/101* (2023.02); *H10N 52/85* (2023.02)

(58) Field of Classification Search
CPC ..... G01R 33/072; H10N 52/101; H10N 50/85
See application file for complete search history.

(56) References Cited

U.S. PATENT DOCUMENTS

| | | | | |
|---|---|---|---|---|
| 3,836,993 | A | * 9/1974 | Joshi | H10D 48/40 257/284 |
| 5,065,204 | A | 11/1991 | Tomisawa et al. | 357/27 |
| 5,173,758 | A | 12/1992 | Heremans | 257/188 |
| 5,536,953 | A | 7/1996 | Dreifus et al. | 257/77 |
| 2003/0094943 | A1 | 5/2003 | Ashley et al. | 324/251 |
| 2009/0146231 | A1* | 6/2009 | Kuper | G01R 33/07 257/E29.323 |
| 2014/0369380 | A1 | 12/2014 | Ausserlechner | 374/57 |

FOREIGN PATENT DOCUMENTS

RU            162967 U1 * 7/2016

OTHER PUBLICATIONS

RU0-162967 (Year: 2016).*
R. S. Popovic, Hall Effect Devices, 2nd ed. Institute of Physics, 2004.
S. M. Sze and K. N. Knok, Physics of Semiconductor Devices, 3rd ed. 2006.
S. Dimitrijev, Principles of Semiconductor Devices, 2nd ed. Oxford Press, 2012.
T. White, S. Shetty, M. Ware, H. A. Mantooth, and G. J. Salamo, "AlGaN/GaN Micro-Hall Effect Devices for Simultaneous Current and Temperature Measurements From Line Currents," IEEE Sensors Journal, vol. 18, No. 7, Apr. 2018.

(Continued)

*Primary Examiner* — Latanya N Crawford Eason
(74) *Attorney, Agent, or Firm* — Keisling & Pieper PLC; Trent C. Keisling; David B. Pieper

(57) ABSTRACT

A Hall sensor with a main current path and a sensor path including at least one Schottky contact thereby increasing the capabilities above an ohmic contact Hall sensor.

16 Claims, 10 Drawing Sheets

(56) References Cited

OTHER PUBLICATIONS

S. K. Cheung and N. W. Chueng, "Extraction of Schottky Diode Parameters From Forward Current-Voltage Characteristics," Applied Physics Letters, vol. 49, No. 85, Jul. 1986.
K. Shinohara and et al, "Scaling of GaN HEMTs and Schottky Diodes for Submillimeter-Wave MMIC Applications," IEEE Transactions on Electron Devices, vol. 60, No. 10, Oct. 2013.

* cited by examiner (a) (b)

SCHOTTKY-HALL EFFECT AND SENSOR

CROSS-REFERENCE TO RELATED APPLICATIONS

This application claims priority to and is a continuation-in-part of U.S. patent application Ser. No. 16/415,049, filed on May 17, 2019 entitled SCHOTTKY-HALL EFFECT AND SENSOR which is a continuation-in-part of U.S. Patent Application Ser. No. 62/674,988, filed on May 22, 2018 entitled SCHOTTKY-HALL EFFECT AND SENSOR both of which are hereby incorporated by reference in their entirety.

STATEMENT REGARDING FEDERALLY SPONSORED RESEARCH OR DEVELOPMENT

This invention was made with government support under cooperative agreement EEC-1449548 awarded by National Science Foundation Engineering Research Center for Power Optimization of Electro Thermal Systems (POETS). The government has certain rights in the invention.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in any device based on the Hall effect such as Hall sensors. More particularly, the invention relates to improvements by utilizing a Schottky contact in combination with a Hall device to create a Schottky-Hall device. In particular, the present invention relates specifically to use of Schottky contacts with the conductive material in a Hall device to increase sensitivity.

2. Description of the Known Art

As will be appreciated by those skilled in the art, two effects are known in the prior art, the Hall effect, and the Schottky barrier.

The Hall effect is the production of a voltage difference known as the Hall voltage across an electrical conductor, transverse to an electric current in the conductor and to an applied magnetic field perpendicular to the current. Hall devices measure the magnitude of a magnetic field. The Hall device sends a current through a conductive material with output terminals that are perpendicular to the direction of the flow of current. In the presence of a magnetic field, an output voltage that is proportional to the magnetic field strength and the current through the conductive material is produced at these terminals. This voltage is therefore heavily dependent on the majority carrier velocity in the conductive material. The voltage is typically in the microvolt range and requires amplification. Thus, Hall devices are generally limited by the material carrier mobility when considering maximum magnetic field sensitivity.

The Hall effect has been known for over a hundred years, but it used to measure the magnitude of a magnetic field in broad applications is much more recent. For example, Hall effect devices are included in many products, ranging from computers, to moving vehicles, to aircraft, to medical equipment.

A Schottky barrier, named after Walter H. Schottky, is a potential energy barrier for electrons formed at a metal-semiconductor junction.

Note in the prior art that the use of a Schottky contact has been intentionally avoided in all Hall devices. The preferred electrical contact used in Hall devices has been an ohmic contact.

Patents disclosing information relevant to electronic devices include: U.S. Pat. No. 5,173,758, issued to Heremans on Dec. 22, 1992 entitled Hall generator with four arms. The abstract reads: A Hall generator includes a substrate body of single crystalline semi-insulating gallium arsenide having a surface. A thin layer, no greater than about 5 micrometers in thickness, of single crystalline indium arsenide is on the surface of the body and is in the form of four arms joined at a common point to form a cross. A separate metal contact is on each of the arms at the free end thereof. An accumulation layer is adjacent to the outer surface of the indium arsenide layer and extends along the entire surface of the indium arsenide layer between the contacts. The accumulation layer is effective to provide a magnetic sensitivity and range of operating temperatures as if the indium arsenide layer was much thinner and had a much higher electron density and electron mobility. Electrical devices, such as field effect transistors, may be formed in the body and the surface and electrically connected to the contacts of the Hall generator in a desired circuit. This patent is hereby expressly incorporated by reference in its entirety.

Other references include:

R. S. Popovic, Hall Effect Devices, 2nd ed. Institute of Physics, 2004.

S. M. Sze and K. N. Knok, Physics of Semiconductor Devices, 3rd ed. 2006.

S. Dimitrijev, Principles of Semiconductor Devices, 2nd ed. Oxford Press, 2012.

T. White, S. Shetty, M. Ware, H. A. Mantooth, and G. J. Salamo, "AlGaN/GaN Micro-Hall Effect Devices for Simultaneous Current and Temperature Measurements From Line Currents," IEEE Sensors Journal, vol. 18, no. 7, April 2018.

S. K. Cheung and N. W. Chueng, "Extraction of Schottky Diode Parameters From Forward Current-Voltage Characteristics," Applied Physics Letters, vol. 49, no. 85, July 1986.

K. Shinohara and et al, "Scaling of GaN HEMTs and Schottky Diodes for Submillimeter-Wave MMIC Applications," IEEE Transactions on Electron Devices, vol. 60, no. 10, October 2013.

T. White, S. Shetty, M. Ware, H. A. Mantooth, and G. Salamo, "Micro-Hall Effect Devices for Simultaneous Current and Temperature Measurements for Both High and Low Temperature Environments."

From these prior references it may be seen that these prior art patents are very limited in their teaching and utilization, and an improved Schottky Hall device is needed to overcome these limitations.

SUMMARY OF THE INVENTION

The present invention is directed to a Schottky Hall device and method. In accordance with one exemplary embodiment of the present invention, a Schottky Hall device using Schottky contacts to the Hall material and creation of a depleted region.

Building on the two distinct foundations of the Hall effect and Schottky barrier, the present invention provides a way to increase the sensitivity of any device operating on the principle of the Hall effect to at least several times greater than the state-of-the-art, with a proven increase of at least three times. It is based on the use of Schottky contacts to the Hall material and creation of a depleted region to form the Schottky Hall sensor. In the Schottky Hall sensor, the diode is part of the Greek-cross body so that the electron gains an accelerated velocity. Furthermore, the Schottky Hall design removes the need for interconnects to the diode further improving and simplifying the Schottky Hall sensor structure.

The invented Schottky-Hall device increases magnetic field sensitivity of Hall effect sensors beyond that allowed by the material properties such as the charge carrier mobility. Furthermore, the output Hall voltage of the Schottky-Hall device is much more stable with changing temperature than that of a traditional hall cell. At the same time, the ratio of the undesirable offset voltage, always accompanies the Hall voltage, to the Hall voltage is greatly reduced.

Hall sensors that take advantage of a Schottky contact to achieve a sensitivity that exceeds the current technology (without amplification) by at least a factor of 3 with potential of even higher sensitivity, did not exist until the discovery described in this patent disclosure.

Although the Hall sensor detects a magnetic field sensor, it can be used for many other applications, such as, measuring current, pressure, position, or use for micro switching, test equipment that measure magnetic fields, Hall voltages, carrier concentration, and carrier mobility etc. in addition to many other types of sensors.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
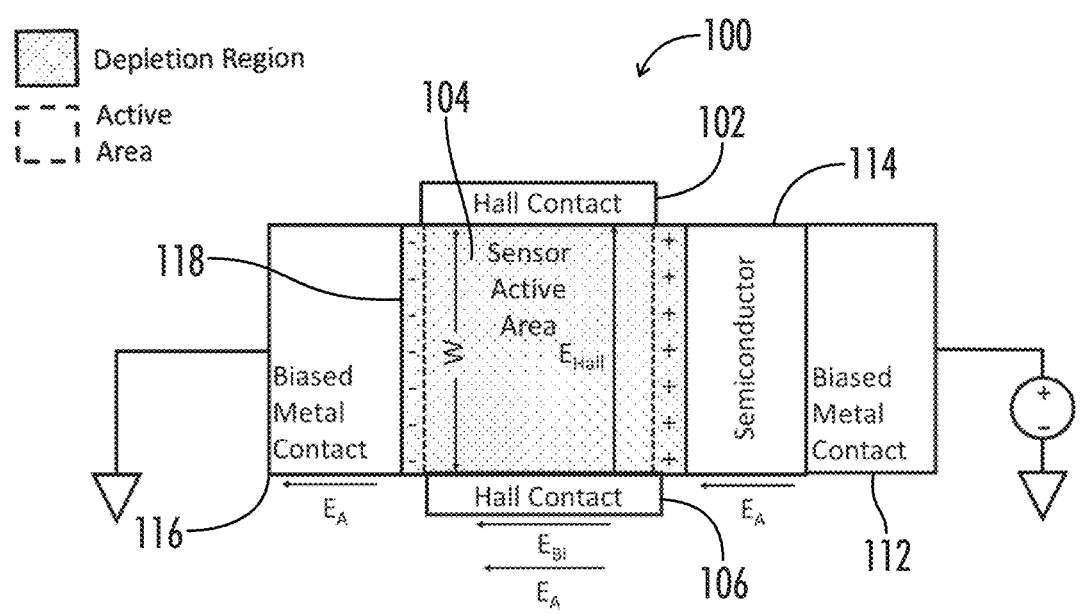
FIG. 1 is a schematic of an ideal Schottky-Hall effect sensor.
Figure 2:
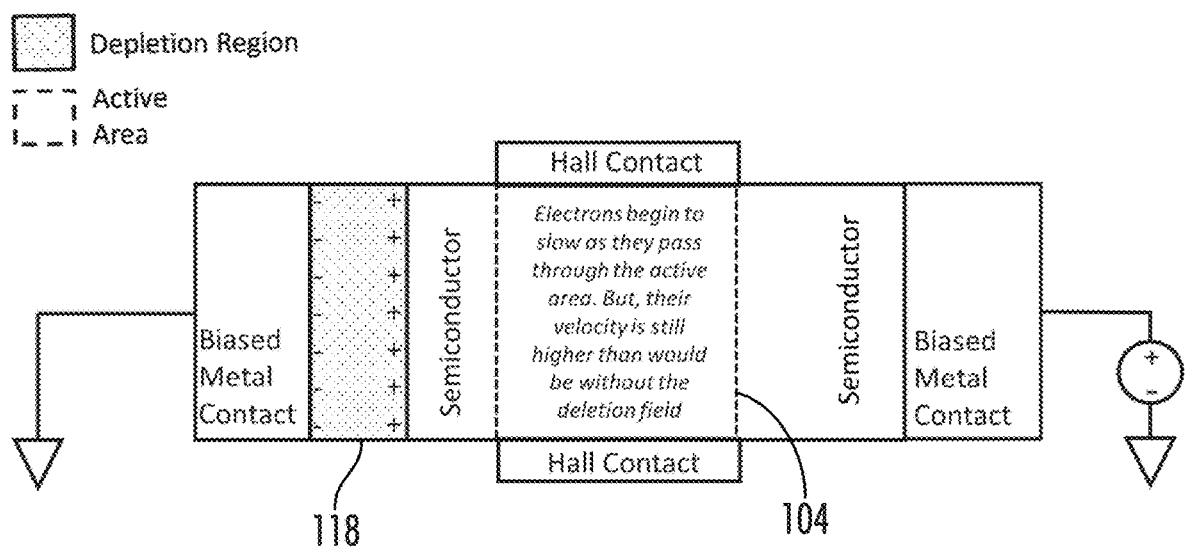
FIG. 2 is a schematic of a Schottky Hall sensor as fabricated.
Figure 3:
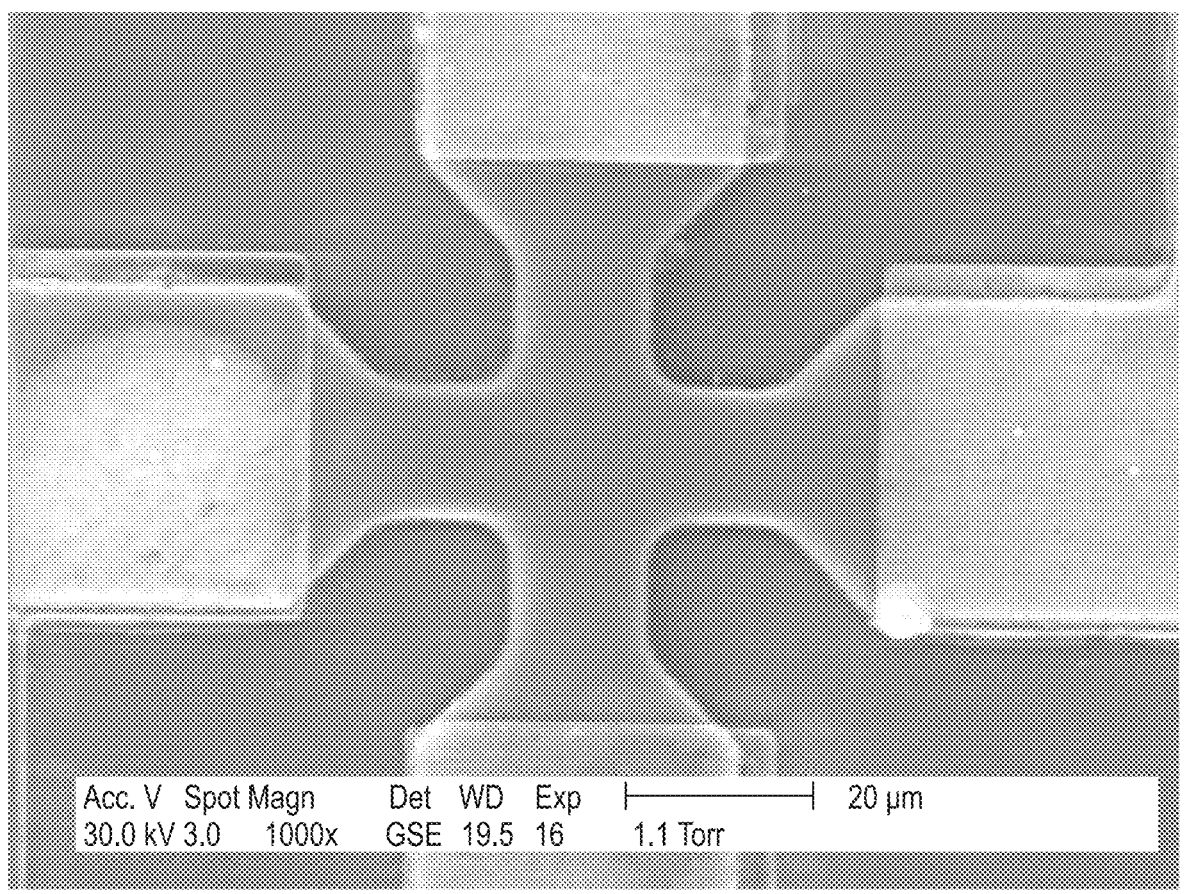
FIG. 3 is a schematic of a Schottky-Hall Greek-Cross as fabricated.

As shown in FIG. 1-3 of the drawings, one exemplary embodiment of the present invention is generally shown as a Schottky-Hall device. The Schottky-Hall device increases magnetic field sensitivity of a Hall effect sensor beyond the state-of-the-art. This is achieved by accelerating charge carriers through a depletion region created by both a built-in voltage and high mobility due to a metal-semiconductor contact and a reverse bias of a Schottky diode. The electric field in the depletion region is much greater for a given bias than that found in a standard Hall effect sensor with Ohmic contacts. In addition, the mobility in the depleted region is expected to be higher due to lower carrier density. Charge carrier velocity dependence on the material mobility and electric field and is described by $$v_d = \mu E_A \qquad \text{Eq. (1)}$$

where $v_d$ is the charge carrier drift velocity, u is the carrier mobility, and $E_A$ is the applied electric field.

$E_A$ is amplified in a Schottky-Hall sensor because of the large internal electric field at the metal-semiconductor interface. The depletion region at the interface can be written as $$Z_d = \sqrt{\frac{2\varepsilon_r\varepsilon_0}{qN_D}(V_{BI} + V_{Rev})} \qquad \text{Eq. (2)}$$

where $Z_d$ is the depletion region width, $\varepsilon_r$ is the semiconductor dielectric constant, $\varepsilon_0$ is the vacuum permittivity, q is the electron charge, $N_D$ is the donor density, $V_{BI}$ is the built-in voltage and $V_{Rev}$ is the reverse bias voltage. The depletion region formation results in a high electric filed which is $$E_{Max} = \sqrt{\frac{2}{\varepsilon_r\varepsilon_0}qN_D(V_{BI} + V_{Rev})} \qquad \text{Eq. (3)}$$

The high electric field increases the charge carrier velocity and thus, the output Hall voltage of a Schottky-Hall sensor is much higher than a standard Hall cell for a given bias current. This is because the Hall voltage is charge carrier velocity dependent and is given by $$V_H = v_d W B \qquad \text{Eq. (4)}$$

where $V_H$ is the Hall voltage, W is the active area width, and B is the magnetic field.

It is important to note that a PN diode, PIN diode, and BJT will have the same effect and is part of the scope of this patent. Note that in the present invention, the diode or junction is part of the Greek-cross so that the electron gains an accelerated velocity because it is integrated. This integrated structure is thereby a simplified structure without the need for interconnects.

The invented Schottky-Hall device increases Hall voltage stability as a function of temperature compared to traditional Hall effect sensors. The increased Hall voltage temperature stability is due to a compensating decreasing resistance across the depletion region. The Fermi level of a semiconductor is temperature dependent. Thus, the work function of a semiconductor and therefore the barrier height of a metal-semiconductor interface is also temperature dependent. As temperature increases both the barrier height decreases and the electron thermal energy increases, and thus the net resistance decreases at the metal-semiconductor interface. When the Schottky-Hall sensor is biased with a constant voltage, the voltage drops across the metal-semiconductor interface and results in a voltage rise across the sensor's active area and thus a higher electric field. Therefore, the electric field across the active area of a Schottky-Hall sensor increases, as temperature increases, in a way that is much greater than that of a standard Hall cell. The increasing electric field counteracts the decreasing charge carrier mobility and stabilizes the charge carrier velocity as shown in Eq. 1.

The invented Schottky-Hall device decreases the offset voltage compared to standard Hall effect cells. The reduced offset voltage results from the lower bias required to achieve the higher sensitivity.

The invented Schottky-Hall device can also simultaneously measure temperature.

The invented Schottky-Hall device can also simultaneously measure light intensity (feature is semiconductor material specific).

For reference in FIGS. 1 and 2, the main components of the Schottky-Hall device 100 are a first ohmic contact 102 and a second ohmic contact 106 connected by a sensor active area 104 within a semiconductor area 114. Also shown are a first biased metal contact 112 and a second biased metal contact 116 connected by a semiconductor area 114 and a depletion area 118. Note that the depletion region 118 is between the first biased metal contact 112 and a second biased metal contact 116 but may or may not be within the sensor active area 104 between the first hall contact 102 and second hall contact 106 as noted below.

In FIG. 1, $E_A$ is the applied electric field, EBI is the built in electric field, and the sensor active area is the area in the semiconductor between the Hall contacts. In FIG. 1, the active area is inside the depletion region and the biased metal contacts are Schottky contacts. The top and bottom Hall contacts are Ohmic contacts. The active area in a Hall sensor is the region in which a Hall voltage can be measured because of the sense contacts. Because the electric filed in the depletion region is high due to a narrow width, the charge carrier velocity in the depletion region is also high, see Eq. 1. The benefit is that this configuration would allow close to saturation velocity to be achieved for a very small bias and corresponding high Hall voltage, see Eq. 4.

In FIG. 2, the active area can even be outside the depletion region, the only difference from FIG. 1. This is not ideal because the charge carrier velocity is now allowed to decrease due to a decreased electric field and increased carrier density. However, the Hall voltage, or electric field, and corresponding Hall charge in the carrier depletion region, along with the low carrier density, produces a new equilibrium carrier concentration, velocity, and Hall charge throughout the semiconductor, which will result in a corresponding higher carrier velocity and average Hall voltage. The carrier concentration and velocity are related by continuity:

$$\nabla \cdot (\rho v) = -\partial \rho / \partial t$$

And therefore, at equilibrium the $$-\frac{\partial \rho}{\partial t} = 0,$$

and:

$$v \cdot \nabla \rho = -\rho \nabla \cdot v$$

So, the velocity v can go up if the carrier density n goes correspondingly down. Therefore, the same current can have a higher velocity and Hall voltage depending on the carrier concentration.

Even though the charge carrier will lose velocity as it leaves the depleted region, the velocity is higher than it would be if the contacts were Ohmic and the carrier density will be correspondingly lower. Therefore, the Hall voltage would be higher when compared to an all Ohmic contact sensor as used in a standard Hall sensor. This device design outside the depletion region is not as effective but may be more practical when considering sensor fabrication since the depletion region is very narrow making it challenging to have a contact localized on the depleted semiconductor region.

A GaN/Al0.20Ga0.80N/GaN high electron mobility transistor, HEMT, structure was grown by molecular beam epitaxy, MBE, and fabricated as Greek Cross Schottky-Hall sensor as shown below. The HEMT structure contains a 5 nm thick GaN cap layer, a 20 nm thick $Al_{0.20}Ga_{0.80}N$ barrier layer, and a 1.5 µm GaN buffer layer that was grown by MBE on a commercial substrate containing 5 µm of semi-insulating GaN and 350 µm of sapphire The growth and fabrication procedure result in a notable difference of contact barrier height. The $GaN/Al_{0.20}Ga_{0.80}N/GaN$ material served as a semiconductor material to prove the concept, but this invention is not limited to GaN based materials. For the proof of concept, two sensors were fabricated from the previously described structure, one with Schottky contacts and the other with ohmic contacts. The fabricated Greek-cross Schottky Hall sensor is shown in FIG. 3.

In order to measure the Schottky contact barrier height, a diode was made with one Schottky contact and one ohmic contact. We start with the standard Schottky diode equation $$I_D = A_{eff} A^* T^2 \exp\left(\frac{-q\Phi_B}{kT}\right)\left[\exp\left(\frac{qV_D}{nkT}\right) - 1\right] \quad \text{Eq. (5)}$$

where $I_n$ is the diode current, $A_{eff}$ is the effective area, $A^*$ is the Richardson's constant, T is temperature, $\Theta B$ is the Schottky barrier height, k is Boltzmann's constant, $V_D$ is the diode voltage, and n is the nonideality factor. For $V_D >> 3KT/q$ we can write $$I_D = A_{eff} A^* T^2 \exp\left(\frac{-q\Phi_B}{kT}\right)\exp\left(\frac{qV_D}{nkT}\right) \quad \text{Eq. (6)}$$

Now we let $\beta=q/kT$ and solve for $V_D$ to obtain $$V_D = \frac{n}{\beta}\ln\left(\frac{I_D}{A_{eff}A^*T^2}\right) + n\Phi_E + I_D R \quad \text{Eq. (7)}$$

From Eq. 7 we can write $$\frac{dV}{d(\ln I_n)} = I_D R + \frac{n}{\beta} \quad \text{Eq. (8)}$$

We can determine n from a plot of $$\frac{dV}{d(\ln I_n)} = vs\ I_D.$$

Also, from Eq. (1) we can let $$V_D - \frac{n}{\beta}\ln\left(\frac{I_D}{A_{eff}A^*T^2}\right) = H \quad \text{Eq. (9)}$$

Figure 4:
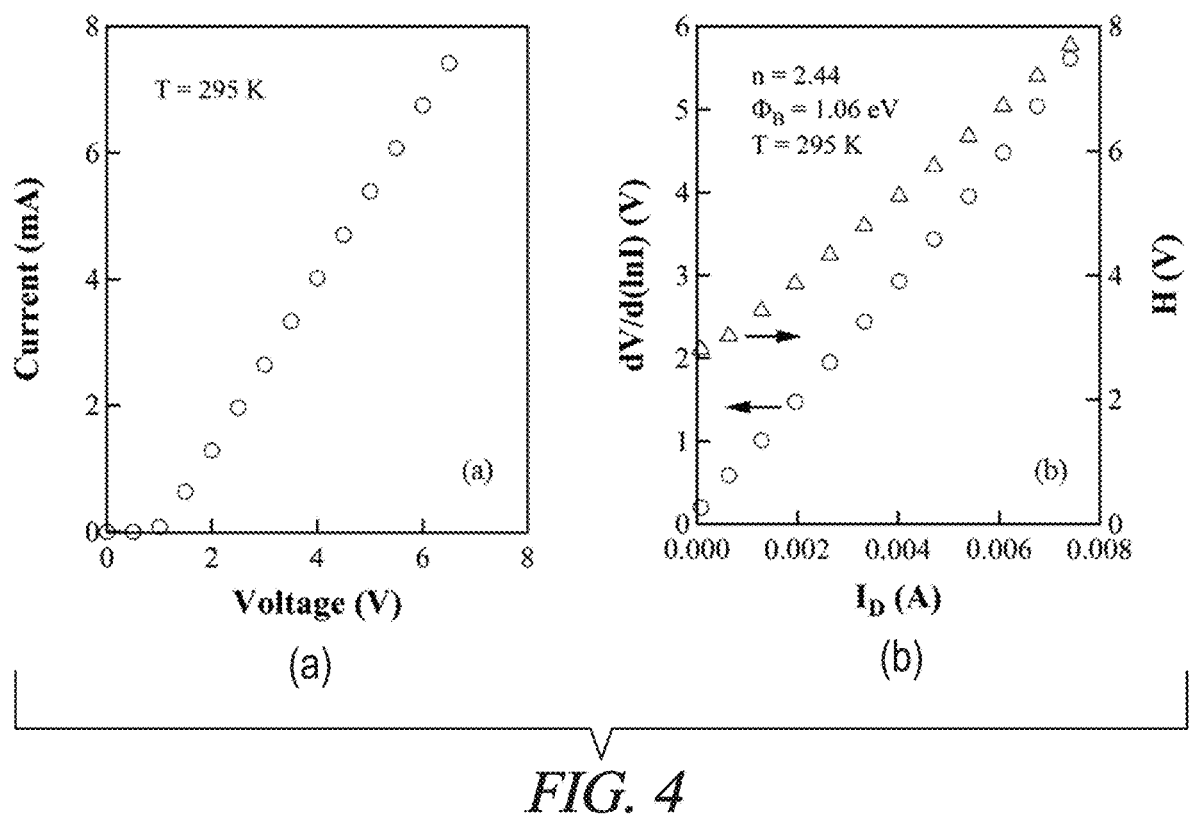
FIG. 4 shows (a) I-V curve for Schottky diode; and (b) Eqs. 8 and 10 plotted to show that n is 2.44 and $\phi$ is 1.06 eV.

Thus, we can now write $$H = I_D R + n\Theta_B \quad \text{Eq. (10)}$$

and plot H vs $I_n$ to find $\Theta_R$ [5].

$$\frac{dV}{d(\ln I_n)}$$

and H vs $I_D$ plots are shown in FIG. 4 and show that n is 2.44 and $\Theta_B$ is 1.06 eV.

Figure 5:
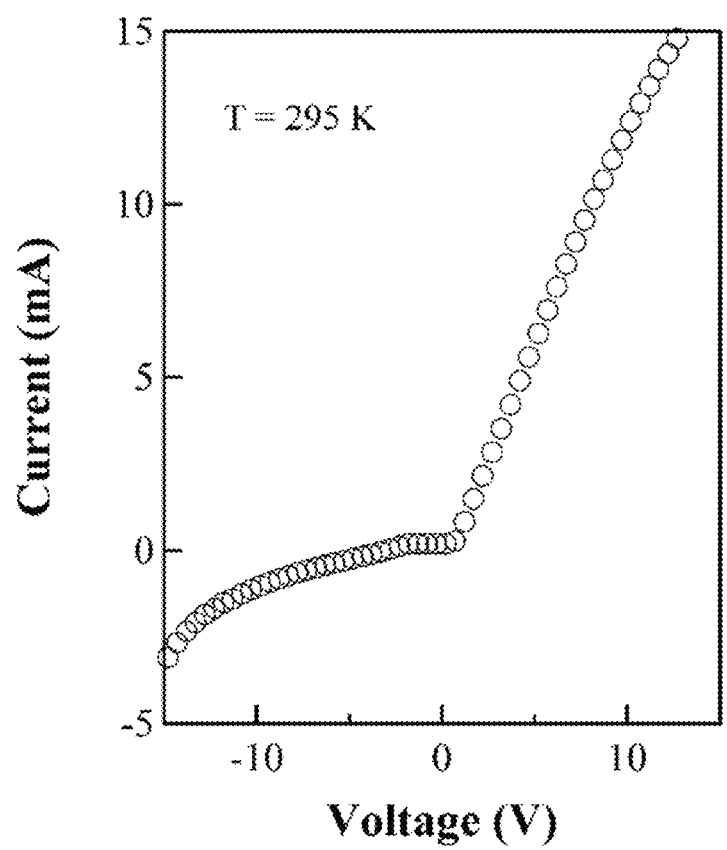
FIG. 5 shows a I-V curve for Schottky diode showing both forward and reverse bias.

With the barrier height known, the depletion region width can now be calculated using Eq. 2. The resulting depletion region width varies between 100 nm to 430 nm for a bias between 0 V to 17 V. The resulting high electric field which can be calculated from Eq. 3 is at least between 0.2 MV/cm and 0.5 MV/cm in this bias voltage range. The breakdown field for AlGaN/GaN HEMT structures is about 3.3 MV/cm. An I-V curve with an extended voltage range is shown in FIG. 5.

Schottky-Hall Sensor Characterization

In this section, data is given for proof of the various concepts that make up this invention.

Figure 6:
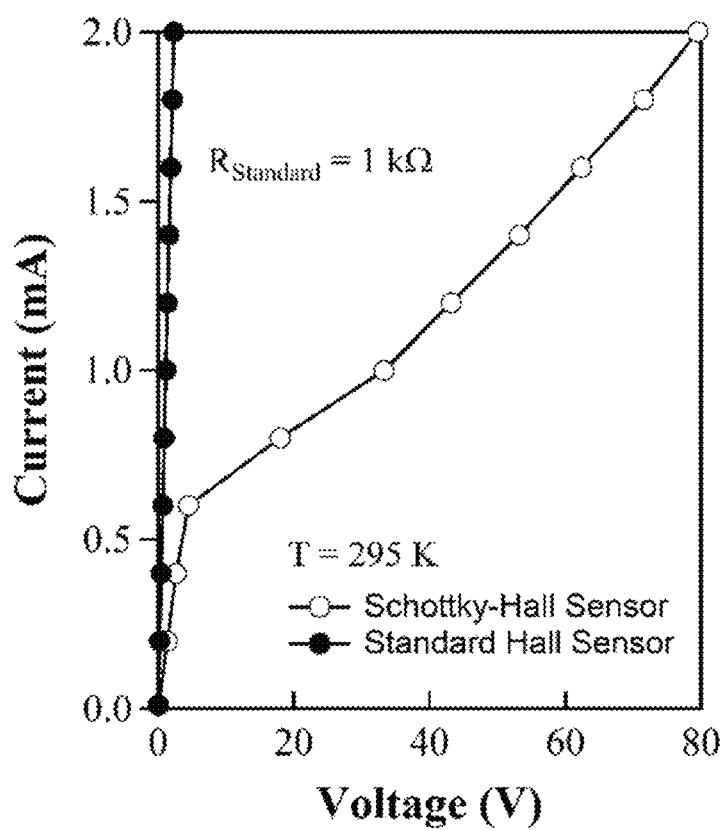
FIG. 6 shows I-V characteristics for a standard Hall sensor, two Ohmic contacts, and a Schottky-Hall sensor, one reversed biased Schottky contact and one forward biased Schottky contact.
Figure 7:
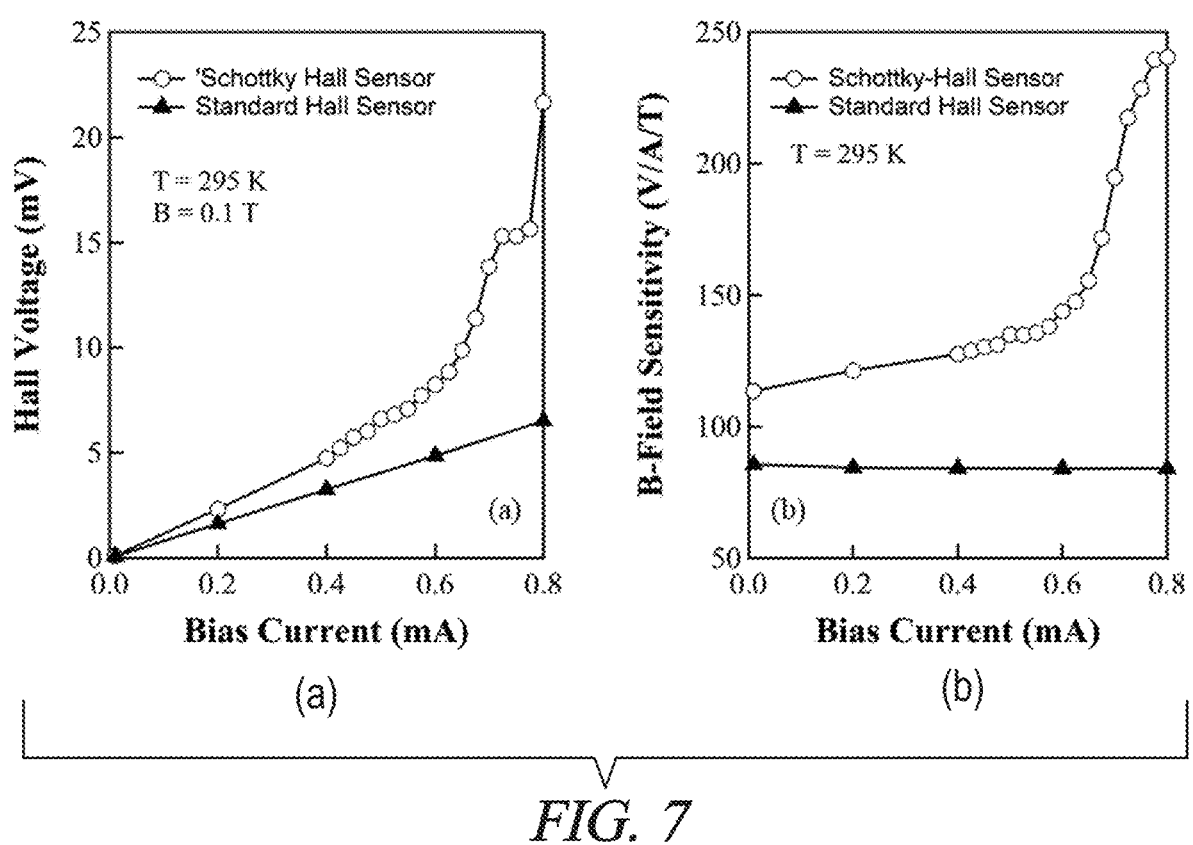
FIG. 7 shows sensitivity of a standard Hall sensor and a Schottky-Hall sensor with (a) Hall voltage vs. bias current and (b) magnetic field sensitivity vs. bias current.

One aspect of the present invention is that the invented Schottky-Hall device increases magnetic field sensitivity of a Hall effect sensors beyond that of the material property limitations such as charge carrier mobility for low bias operation. To prove this, two different devices were fabricated which include a Schottky-Hall sensor with four Schottky contacts and a standard Hall effect sensor with four Ohmic contacts. I-V curves for both samples are shown are shown in FIG. 6. Only one bias direction is given to insure repeatability. Again, the working principle here is that a charge carrier, in this case an electron, is accelerated through the high electric field of the depletion region of the reversed biased Schottky contact. This results in an electron density gradient across the length of the channel and thus a mobility gradient as well with higher mobility electrons located at regions with lower electron density. The two effects of higher mobility and higher initial velocity cause the electron to have a higher velocity when it reaches the active area of the Greek-cross structure described above. The resulting Hall voltage in a Schottky-Hall sensor is higher than a standard Hall sensor when operating conditions are equivalent, which is shown in FIG. 7(a). At the same time the, the magnetic field sensitivity can increase with bias because small changes in the reverse bias voltage results in large changes in electric field in the depletion region. The result, shown in FIG. 7b, is a bias dependent magnetic field sensitivity unique to Schottky-Hall sensors and is much higher than that of standard Hall sensors.

Figure 8:
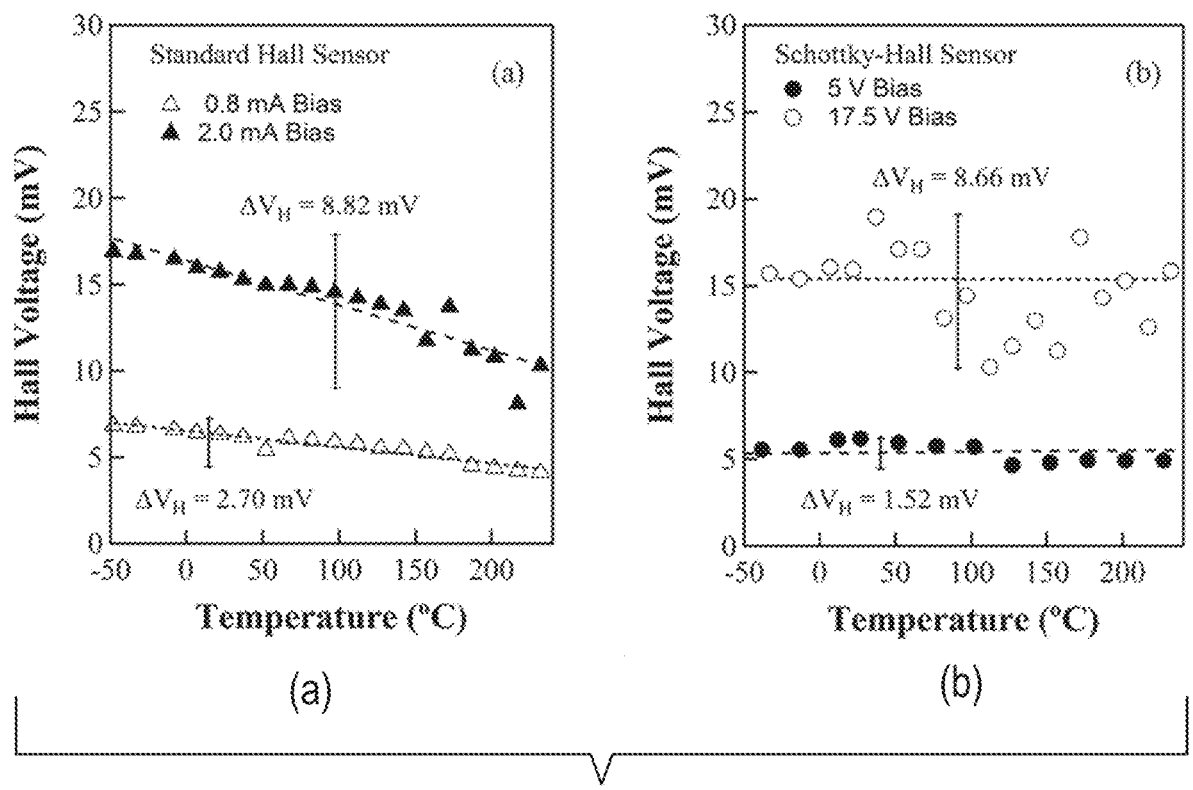
FIG. 8 shows temperature dependent Hall voltage data for both the (a) standard Hall sensor and (b) Schottky-Hall sensor.

Another aspect of the present invention is that the invented Schottky-Hall device increases Hall voltage stability as a function of temperature compared to traditional Hall effect sensors. The standard Hall sensor exhibits a thermal drift due to an increasing resistance across the sample as shown in FIG. 8. The increasing voltage drop as a function of temperature across the sample is not enough to offset the decreasing mobility. Therefore, the Hall voltage decreases as a steady rate. The total Hall voltage drop across the sample for a 0.8 mA and 2.0 mA bias was 2.70 mV and 8.82 mV, respectively. The thermal drift was not observed in the Schottky-Hall sensor. This is because the of the Schottky barrier height decreasing along with electrons gaining thermal energy with increasing temperature causing the resistance across the metal-semiconductor junction to decrease with increasing temperature. Therefore, the electric field across the active area of the sensor increases with temperature and compensates the reducing mobility. Thus, the electron velocity is more stable. For high bias, the noise appears in the Hall voltage of the Schottky-Hall sensor. This is possibly due to randomness between single electron velocities. This effect may be avoided by moving the active area closer to the reversed biased Schottky contact which may reduce the spread in single electron velocities as well as reduce the carrier concentration. In any case, the point made by this data is that the downward trend of $V_H$ (T) is not present in the Schottky-Hall sensor. FIG. 8 shows the temperature dependent Hall voltage data for both the (a) standard Hall sensor and (b) Schottky-Hall sensor.

Figure 9:
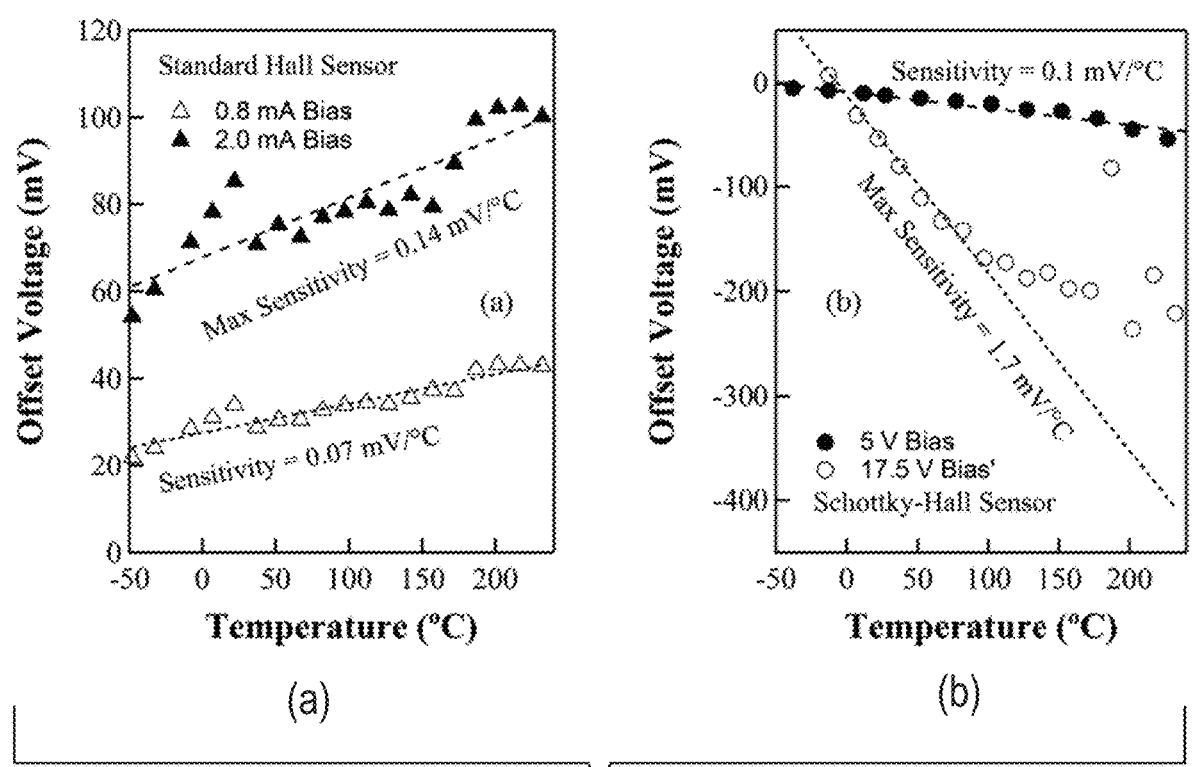
FIG. 9 shows Temperature dependent offset voltage data for both the (a) standard Hall sensor and (b) Schottky-Hall sensor.

Yet another aspect of the present invention is that the invented Schottky-Hall device has a lower offset voltage compared to standard Hall Effect cells and can simultaneously measure temperature. The Schottky-Hall sensor exhibits a much higher sensitivity to changing temperature because of the Schottky barrier height decreasing along with electrons gaining thermal energy with increasing temperature causing the resistance across the metal-semiconductor junction to decrease rapidly with increasing temperature. A comparison of offset voltage between the Schottky-Hall sensor and a standard Hall sensor is shown in FIG. 9. The highest rate of change in offset voltage as a function of temperature in this study is 1.1 mA/C, which is 10× higher than of the standard Halls sensor for the same current bias.

Figure 10:
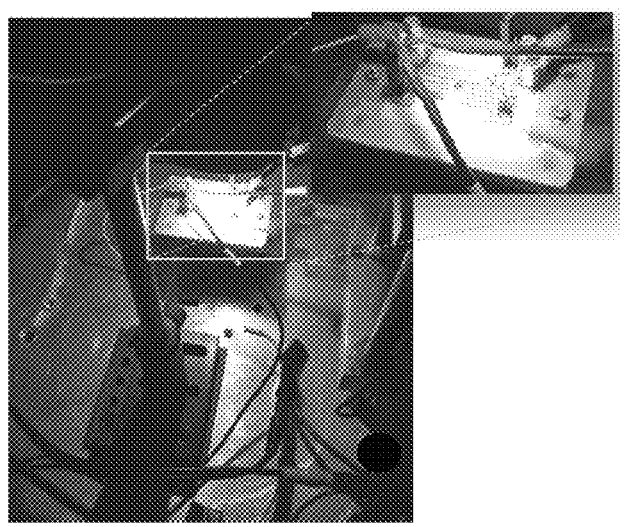
FIG. 10 shows (a) Test setup for (b) offset voltage versus light power.
Figure 10:
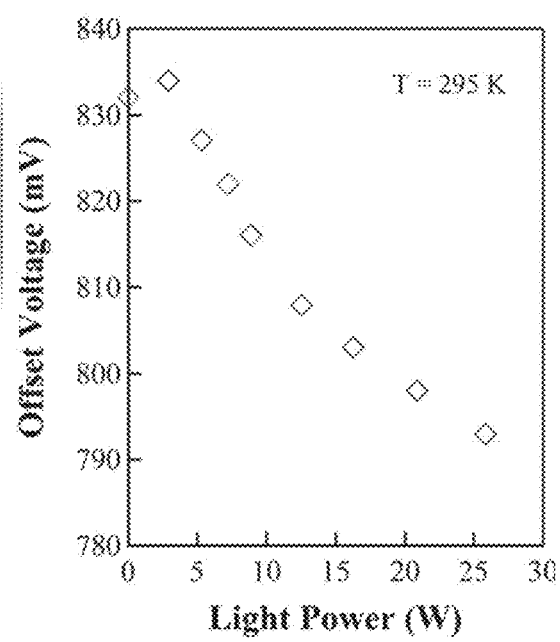

A still further aspect is that the invented Schottky-Hall device can measure light intensity. Phonons excite electrons and cause a reduction in the Schottky barrier resulting in a decrease in offset voltage as the light intensity increases. The test setup for the offset voltage of the Schottky-Hall sensor vs light power and data are shown in FIG. 10.

To improve on the Schottky Hall device, one method is to optimize the magnitude of the internal space charge field and minimize the carrier concentration. This includes but is not limited to, moving the active area closure to the depletion region of the reversed biased Schottky-Hall sensor.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A Schottky-Hall apparatus comprising:
   a Hall effect semiconductor;
   a first ohmic sensor contact directly connected to the Hall effect semiconductor;
   a second ohmic sensor contact directly connected to the Hall effect semiconductor;
   the Hall effect semiconductor including a sensor active area between the first ohmic sensor contact and the second ohmic sensor contact;
   a first Schottky-biased-metal-semiconductor-contact directly connected to the Hall effect semiconductor;
   a second Schottky-biased-metal-semiconductor contact directly connected to the Hall effect semiconductor; and
   the first and second Schottky-biased-metal-semiconductor-contacts biasing the Hall effect semiconductor to create a depletion area positioned between the first Schottky-biased-metal-semiconductor-contact and the second Schottky-biased-metal-semiconductor-contact.

2. The Schottky-Hall apparatus of claim 1, further comprising:
   the depletion area positioned at least partially within the sensor active area.

3. The Schottky-Hall apparatus of claim 1, further comprising:
   the depletion area positioned completely within the sensor active area.

4. The Schottky-Hall apparatus of claim 1, further comprising:
   the sensor active area providing a magnetic field sensitivity.

5. The Schottky-Hall apparatus of claim 4, further comprising:
   a voltage bias applied across the first Schottky-biased-metal-semiconductor-contact and second Schottky-biased-metal-semiconductor-contact; and
   the magnetic field sensitivity dependent on the voltage bias.

6. The Schottky-Hall apparatus of claim 4, further comprising:
   the Hall effect semiconductor having an unbiased charge carrier mobility; and
   a voltage bias applied across the first Schottky-biased-metal-semiconductor-contact and second Schottky-biased-metal-semiconductor-contact allowing the magnetic field sensitivity to operate beyond the unbiased charge carrier mobility.

7. The Schottky-Hall apparatus of claim 1, further comprising:
   the sensor active area sensitive to temperature changes.

8. The Schottky-Hall apparatus of claim 1, further comprising:
   the sensor active area simultaneously sensitive to both magnetic fields and temperature changes.

9. The Schottky-Hall apparatus of claim 1, further comprising:
   a sensor voltage measured across the first ohmic sensor contact and the second ohmic sensor contact having a sensitivity greater than 0.2 millivolts per degree Celcius.

10. The Schottky-Hall apparatus of claim 1, further comprising:
    the Hall effect semiconductor having an operating temperature range;
    a sensor voltage measured across the first ohmic sensor contact and the second ohmic sensor contact maintaining a voltage stability of less than 2 mV across the operating temperature range.

11. The Schottky-Hall apparatus of claim 1, further comprising:
    the sensor active area sensitive to light changes.

12. The Schottky-Hall apparatus of claim 1, further comprising:
    wherein the Hall effect semiconductor, first ohmic sensor contact, second ohmic sensor contact, first Schottky-biased-metal-semiconductor-contact, and second Schottky-biased-metal-semiconductor-contact form a Greek cross shaped body.

13. A Schottky-Hall apparatus comprising:
    a Hall effect semiconductor;
    a first ohmic sensor contact directly connected to the Hall effect semiconductor;
    a second ohmic sensor contact directly connected to the Hall effect semiconductor;
    the Hall effect semiconductor including a sensor active area between the first ohmic sensor contact and the second ohmic sensor contact;
    a first Schottky-biased-metal-semiconductor-contact directly connected to the Hall effect semiconductor;
    a second biased contact directly connected to the Hall effect semiconductor;
    the first Schottky-biased-metal-semiconductor-contact and the second biased contact biasing the Hall effect semiconductor to create a depletion area positioned between the between the first Schottky-biased-metal-semiconductor-contact and the second biased contact.

14. The Schottky-Hall apparatus of claim 13, further comprising:
    the depletion area positioned at least partially within the sensor active area.

15. The Schottky-Hall apparatus of claim 13, further comprising:
    the depletion area positioned completely within the sensor active area.

16. The Schottky-Hall apparatus of claim 13, further comprising:
- the first Schottky-biased-metal-semiconductor-contact connected to the semiconductor forming a Schottky diode.

\* \* \* \* \*